United States Patent
Aboaf et al.

[11] Patent Number: 6,038,110
[45] Date of Patent: Mar. 14, 2000

[54] DUAL HEADER TAPE HEAD DESIGN

[75] Inventors: Joseph Adam Aboaf, Tucson, Ariz.; Thomas Beaulieu, Pebble Beach, Calif.; Vincent Noel Kahwaty, deceased, late of Tucson, Ariz., by Beverly M. Kahwaty, legal representative; Mohamad Towfik Krounbi, San Jose; David John Seagle, Morgan Hill, both of Calif.

[73] Assignee: International Business Machines Corporation, Armonk, N.Y.

[21] Appl. No.: 08/762,826

[22] Filed: Dec. 6, 1996

[51] Int. Cl.[7] .................... G11B 5/127; G11B 5/147
[52] U.S. Cl. ....................... 360/126; 29/603.14
[58] Field of Search ...................... 360/119, 120, 360/125, 126; 29/603.14, 603.13

[56] References Cited

U.S. PATENT DOCUMENTS

| | | | |
|---|---|---|---|
| 4,782,416 | 11/1988 | Hillenbrand et al. | 360/125 |
| 4,878,290 | 11/1989 | Masud et al. | 29/603 |
| 4,951,166 | 8/1990 | Schewe | 360/119 |
| 5,126,907 | 6/1992 | Hamakawa et al. | 360/126 |
| 5,157,570 | 10/1992 | Shukovsky et al. | 360/126 |
| 5,224,002 | 6/1993 | Nakashima et al. | 360/126 |
| 5,264,981 | 11/1993 | Campbell et al. | 360/126 |
| 5,313,356 | 5/1994 | Ohkubo et al. | 360/126 |
| 5,314,596 | 5/1994 | Shukovsky et al. | 204/192.2 |
| 5,333,086 | 7/1994 | Frey et al. | 360/126 |
| 5,385,637 | 1/1995 | Thayamballi | 156/656 |
| 5,590,008 | 12/1996 | Tanabe et al. | 360/126 |

*Primary Examiner*—William Klimowicz
*Attorney, Agent, or Firm*—Gray Cary Ware & Freidenrich LLP; Ervin F. Johnston

[57] ABSTRACT

A thin-film magnetic head includes a substrate having first and second magnetic layers disposed above the substrate and formed as a laminated sequence of magnetic sub-layers. The first and second magnetic layers have corresponding first ends representing a pole tip region of the head, corresponding second ends representing a back gap region of the head, and corresponding intermediate portions representing an intermediate region of the head between the pole tip region and the back gap region. The first and second magnetic layers are joined together in physical contact at the back gap region and are spaced from one another at the pole tip region and at the intermediate region. A nonmagnetic gap layer is disposed between the first and second magnetic layers at the pole tip region. A magnetic coil structure is disposed between the first and second magnetic layers at the intermediate region. The second magnetic layer has a sloped region wherein the second magnetic layer slopes away from the first magnetic layer behind the pole tip region to form a space for the magnetic coil structure. The sloped region of the second magnetic layer may have less magnetic permeability than other portions of the second magnetic layer. A third magnetic layer is thus disposed on the second magnetic layer and extends from the back gap region to cover at least the sloped region of the second magnetic layer.

11 Claims, 5 Drawing Sheets

DUAL HEADER TAPE HEAD DESIGN

BACKGROUND OF THE INVENTION

1. Field of the Invention

The invention generally relates to the field of magnetic recording. More specifically, the invention relates to thin-film magnetic heads for use in magnetic recording systems wherein the head contacts the media, as in magnetic tape recording. Still more particularly, the invention concerns a tape drive having an improved thinfilm magnetic recording head providing the advantages of superior wear resistance and improved magnetic permeability.

2. Description of the Prior Art

Thin-film magnetic recording heads are manufactured using well-known batch-fabrication techniques in which plurality of head structures are formed on a single wafer substrate by depositing successive layers of material (film layers). Two magnetic film layers are typically used to form a yoke structure. At the forward end of the head, where the head interfaces with the magnetic medium, the magnetic layers are separated by a gap layer of nonmagnetic material to form a pole tip region. Rearwardly of the poles, the magnetic layers are spaced apart to accommodate a flat conductor coil structure which is disposed between the layers. The magnetic layers are then joined rearwardly of the coil structure to form the back gap portion of the head.

In the design of thin-film magnetic recording heads that contact an underlying magnetic medium, such as tape, superior magnetic properties combined with good magnetic characteristics are important concerns. In the past, head designers have utilized layers of PERMALLOY. an 80%/20% NiFe composite, for the poles because of its excellent wear characteristics. Although it has superior magnetic characteristics, permalloy is ductile and will differentially recess when worn with conventional particulate recording media. Pure permalloy poles have been shown to recess too much, eventually preventing the head from writing.

Given the deficiencies of permalloy, head designers have turned in recent years to mechanically hard vacuum deposited films for fabricating the poles because of their excellent wear characteristics. The laminate, however, is difficult to apply thickly, is less magnetically permeable than permalloy, and generally cannot be deposited uniformly across a wafer or from wafer to wafer. These latter problems reduce the writeability of the head and require the drive designer to use expensive adjustable write current technologies.

In order to improve the magnetic properties of laminated film heads, designers have sometimes placed thick permalloy "shaping layers" on top of the upper laminated pole (the P2 pole) in order to decrease the reluctance thereof. The permalloy layer extends from the back gap portion of the head but is recessed from the pole tip because thin poles are considered desirable in order to sharpen the readback response. By recessing the permalloy layer from the air bearing surface (ABS) designers have sought to realize the twin advantages of a thin pole during readback and a low reluctance magnetic path. U.S. Pat. No. 4,878,290 discloses such a design, as do other prior art publications.

Despite prior art efforts to improve the magnetic performance of laminated heads, it has been observed that the data write efficiency of such heads is marginal in many cases. Designers have been plagued with poor yield due to low inductance and high write current requirements, and solutions for solving these problems have not been forthcoming.

Accordingly, it would be desirable to provide a thin-film magnetic recording head that satisfactorily optimizes the magnetic properties and wear characteristics of the head in a uniform manner on a single wafer and from wafer to wafer.

SUMMARY OF THE INVENTION

In accordance with the present invention, a thin-film magnetic head includes a substrate having first and second magnetic layers disposed above the substrate and formed as a laminated sequence of magnetic and non-magnetic sublayers. The first and second magnetic layers have corresponding first ends representing a pole tip region of the head, corresponding second ends representing a back gap region of the head, and corresponding intermediate portions representing an intermediate region of the head between the pole tip region and the back gap region. The first and second magnetic layers are joined together in physical contact at the back gap region and are spaced from one another at the pole tip region and at the intermediate region. A nonmagnetic gap layer is disposed between the first and second magnetic layers at the pole tip region. A magnetic coil structure is disposed between the first and second magnetic layers at the intermediate region. The second magnetic layer has a sloped region wherein the second magnetic layer slopes away from the first magnetic layer behind the pole tip region to form a space for the magnetic coil structure. The sloped region of the second magnetic layer may have less magnetic permeability than other portions of the second magnetic layer. A third magnetic layer is thus disposed on the second magnetic layer and extends from the back gap region to cover at least the sloped region of the second magnetic layer.

The foregoing and other features and advantages of the invention will be apparent from the following more particular description of a preferred embodiment of the invention, as illustrated in the accompanying drawings.

BRIEF DESCRIPTION OF THE DRAWINGS

FIG. 8(*b*) is a diagrammatic end view showing the shape of the side edges of a P2 pole made in accordance with the invention.

DETAILED DESCRIPTION OF PREFERRED EMBODIMENTS

Figure 1:
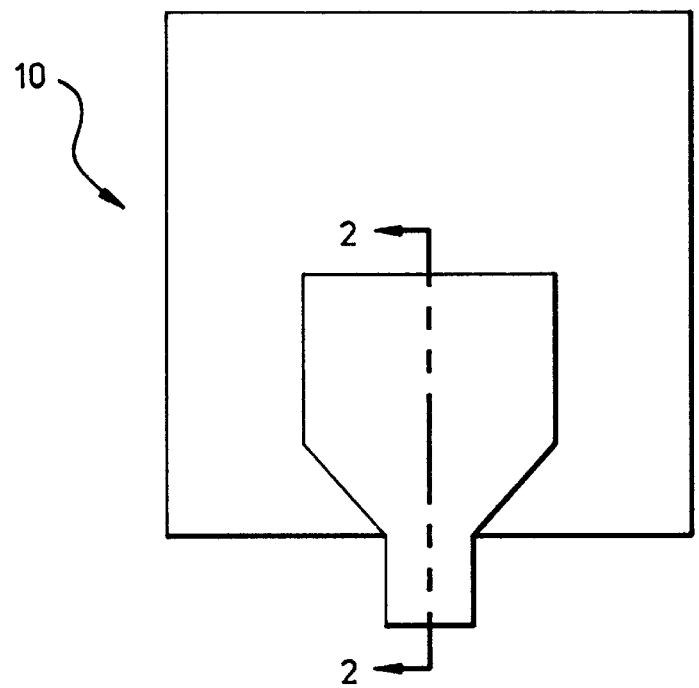
FIG. 1 is a plan view of a thin-film magnetic head constructed in accordance with the invention.
Figure 2:
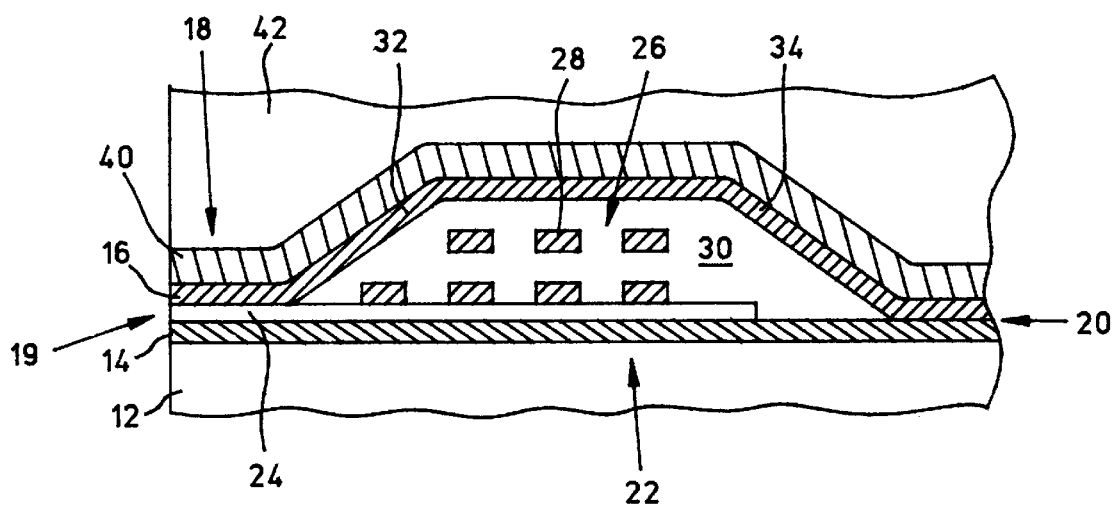
FIG. 2 is a side cross-sectional view taken along line 2—2 in FIG. 1.

Referring now to FIGS. 1 and 2, a thin-film magnetic head 10 includes a yoke structure formed on a wafer substrate 12 made from a composite material of alumina and titanium carbide. The yoke includes first and second magnetic layers 14 and 16 made from a magnetic laminate material, such as a NiFeN/FeN nitride laminate film, applied using a conventional vacuum sputter deposition process. The first magnetic layer 14 is disposed directly above the substrate 12 and is deposited as a laminated sequence of magnetic sub-layers. As is conventional, the first magnetic layer 14 may be enhanced using a shaping layer (not shown) disposed either above or below the first magnetic layer. For purposes of this disclosure, the expression "first magnetic layer" encompasses both magnetic laminate films that are enhanced with a shaping layer and laminates that do not include a shaping layer. The second magnetic layer 16 is disposed above the first magnetic layer and is also formed as a laminated sequence of magnetic sub-layers.

The first and second magnetic layers 14 and 16 have corresponding first ends representing a pole tip region 18 of the head 10. The pole tip region 18 is the area which interacts with the magnetic media on which the head 10 performs read/write operations. It includes a forwardmost portion representing a head-media interface 19, which may also be referred to the air bearing surface or ABS. In accordance with conventional parlance, the first and second magnetic layers 14 and 16 form what are referred to as the P1 and P2 poles, respectively, at the pole tip region 18.

The first and second magnetic layers 14 and 16 also include corresponding second ends representing a back gap region 20 of the head 10. An intermediate region 22 of the head 10 is disposed between the pole tip region 18 and the back gap region 20. The first and second magnetic layers 14 and 16 are spaced from one another at the pole tip region 18 and at the intermediate region 22. At the back gap region, the first and second magnetic layers 14 and 16 are joined together in direct physical contact.

A nonmagnetic gap layer 24 is disposed between the first and second magnetic layers 14 and 16 at the pole tip region 18. The gap layer is made from a nonmagnetic material, such as alumina, and is deposited over the first magnetic layer 14 using a conventional sputter deposition process. The gap layer 24 terminates prior to the back gap region 20 because at that region, the first and second magnetic layers 14 and 16 are joined together.

A magnetic coil structure 26 is disposed between the first and second magnetic layers 14 and 16 at the intermediate region 22. The magnetic coil structure 26 is formed from a flat conductor coil 28 surrounded by an insulating material 30 which may be formed from multiple insulating layers made from hard-baked photoresist. The conductor coil 28 has a plurality of turns arranged in two layers and is deposited by vacuum evaporation or sputtering of copper or aluminum in the form of a spiral patterns. To accommodate the coil structure 26, it will be observed that the second magnetic layer 16 slopes away from the first magnetic layer 14 at a first sloped region 32 located rearwardly behind the pole tip region 18. The second magnetic layer 16 then slopes back toward the first magnetic layer 14 at a second sloped region 34 located forwardly of the back gap region 20.

Figure 3:
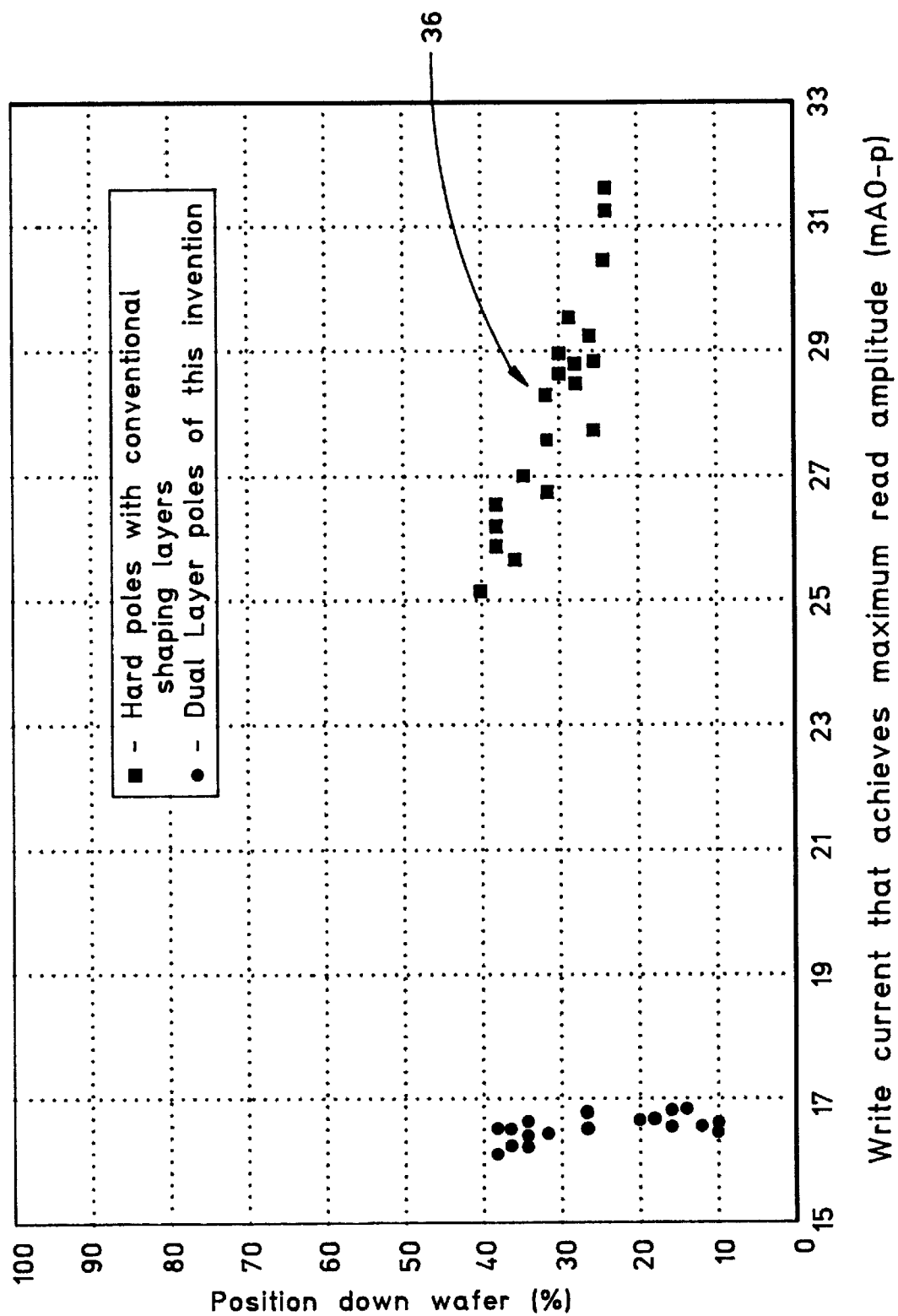
FIG. 3 is a graph showing the reduction in write current achieved by the modifying a laminated magnetic head in accordance with the invention.

Experiments have shown that the first sloped region 32 is critical to the performance of the head 10. The laminate films used to form the first and second magnetic layers 14 and 16 work best when applied to broad flat surfaces during the vacuum deposition process. When sloped surfaces are involved, the magnetic permeability of the magnetic layer varies from head to head and, more importantly, is reduced in overall magnitude. This is shown in the graph of FIG. 3 which compares the write current required to achieve satisfactory performance for heads made in accordance with conventional techniques and heads made in accordance with the invention. In FIG. 3, the cluster of data points 36 on the right-hand portion of the graph represents the prior art thin-film heads while the cluster of data points 38 on the left-hand portion of the graph represents the improved heads made according to the invention. It will be observed that the write current required for the prior art heads varies widely and is higher overall than the improved heads. Heads from 36 have conventional shaping layers on both poles, supporting the flat regions and rearward sloped regions only.

To achieve the improved results of the invention, a third magnetic layer 40 is disposed on the second magnetic layer 16 and extends forwardly from the back gap region 20 to cover at least a portion of the first sloped region 32. Preferably, the third magnetic layer 40 covers all of the first sloped region 32. Still more preferably, the third magnetic layer 40 extends across the pole tip region 18 to the head-media interface 19, where it forms part of the P2 pole. A cover layer 42, made from a nonmagnetic material such as alumina or the like, is preferably applied over the third magnetic layer 40. It too extends to the head-media interface 19. The third magnetic layer 40 is preferably made from a material having a higher magnetic permeability when deposited on a slope than the material used to form the first and second magnetic layers 14 and 16. For first and second magnetic layers made from FeNiN/FeN laminate material, permalloy is a preferred material for the third magnetic layer 40. Unlike the laminate material of the first and second magnetic layers 14 and 16, the permalloy used to form the third magnetic layer 40 can be electro-plated on top of the second magnetic layer 16. The permalloy does not lose magnetic permeability in the first sloped region 32 and serves to enhance the overall magnetic permeability of the P2 pole.

Figure 4:
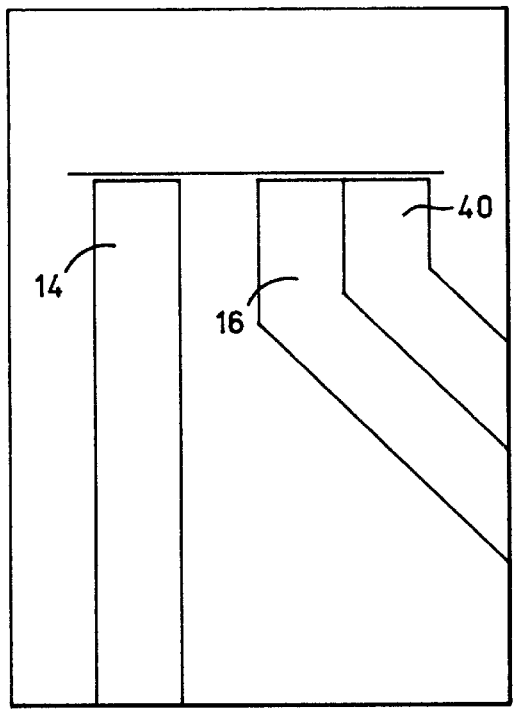
FIG. 4 is a diagrammatic view of the pole tip region of the thin-film magnetic head of FIG. 1 prior to wear.
Figure 5:
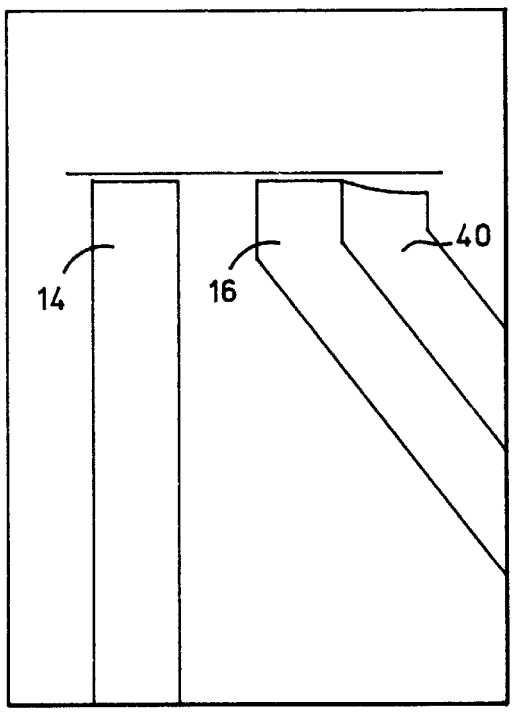
FIG. 5 is a diagrammatic view of the pole tip region of the thin-film magnetic head of FIG. 1 after projected wear of the "third magnetic layer made in accordance with this invention.
Figure 6:
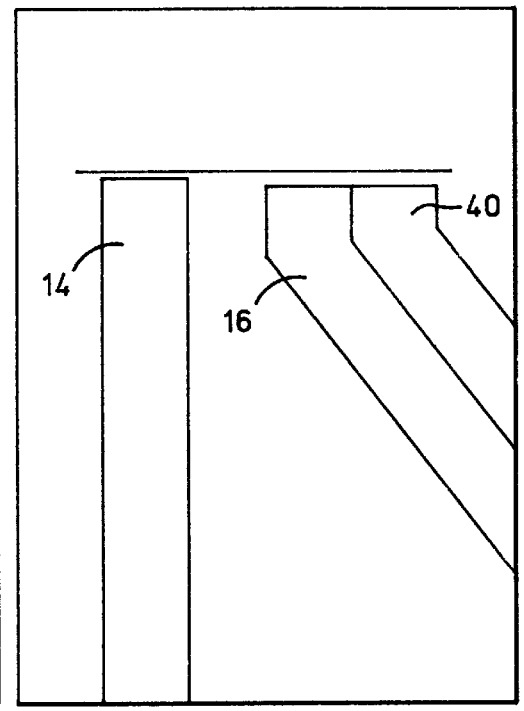
FIG. 6 is a diagrammatic view of the pole tip region of the thin-film magnetic head of FIG. 1 for a fully recessed P2 pole as would be expected if both layers were mechanically soft.
Figure 7:
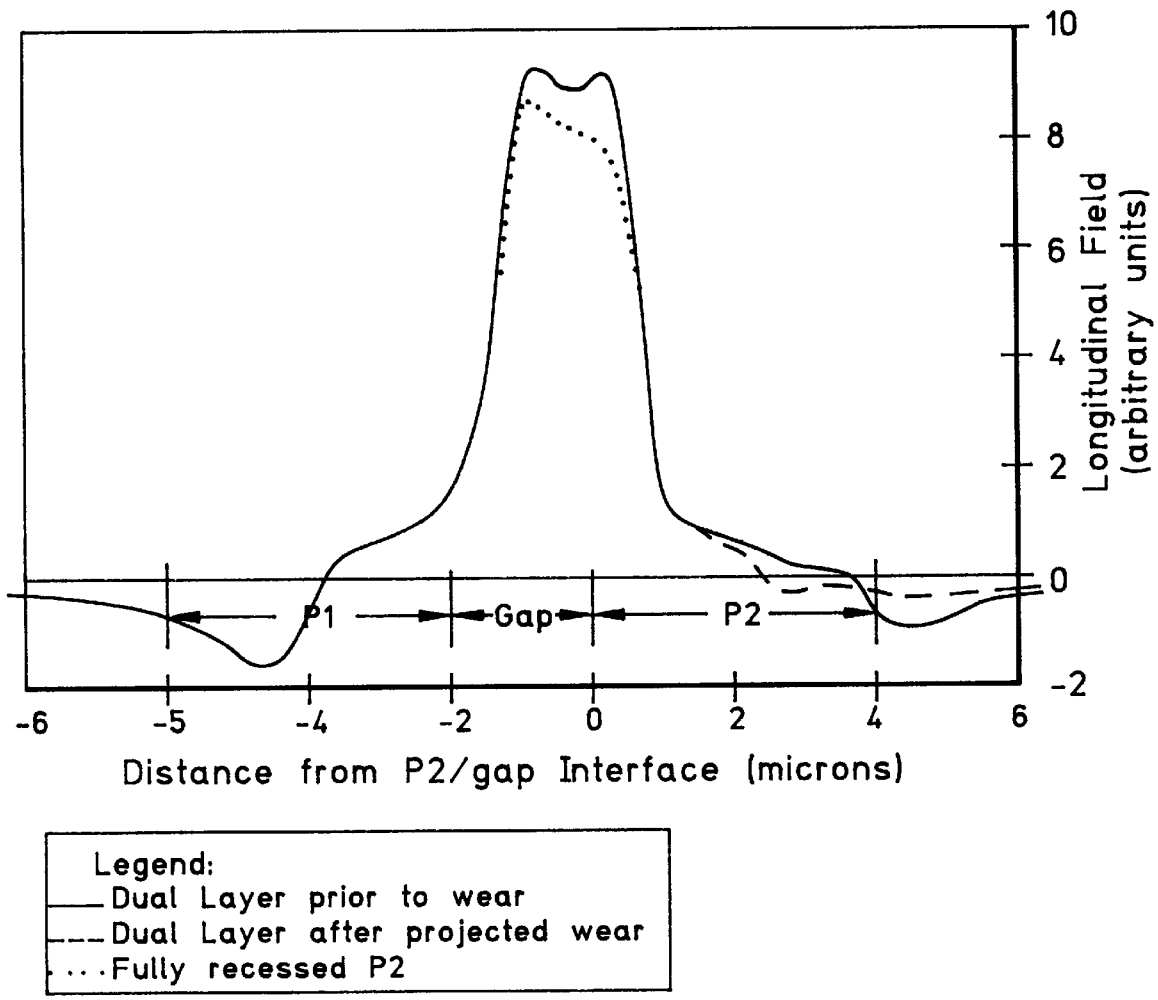
FIG. 7 is a graph showing the strength of the magnetic field generated by the thin-film magnetic head of FIG. 1 during the write mode for each of the wear conditions illustrated in FIGS. 4–6.

The permalloy used as a preferred material for the third magnetic layer 40 tends to wear more rapidly than the relatively hard laminates used to form the first and second magnetic layers 14 and 16. The softer permalloy material will thus mechanically dish out relative to the harder material. However, it has been discovered by magnetic modeling that the magnetic field structure of the improved heads does not significantly degrade so long as the gap-pole interface of each pole maintains the same distance relative to the media. That will ordinarily be the case when hard laminate materials are used for the first and second magnetic layers 14 and 16. FIGS. 4–6 illustrate, respectively, an improved head constructed in accordance with the invention prior to wear, the improved head after projected wear of the third magnetic layer 40, and the improved head with the P2 pole fully recessed. Correspondingly, FIG. 7 is a graph showing the strength of the magnetic field generated by the head 10 during write mode for each of the wear conditions illustrated in FIGS. 4–6. The magnetic field strength is plotted along the surface of the head-media interface 19. FIG. 7 shows that the worn third magnetic layer 40 affects the low field return pulse on the right side of the graph. However, the field under the gap layer 24 (where data is written) is not affected. The field gradient is also not affected. This differs considerably from the field and gradient of the head 10 with a fully recessed P2 pole. Thus, performance is not degraded when the extreme edge of the P2 pole (formed by the third magnetic layer 40) recesses substantially if the inner edge (formed by the second magnetic layer 16) is unaffected. Experimentation with commercially available tapes has shown a wear profile similar to FIG. 5.

Figure 8A:
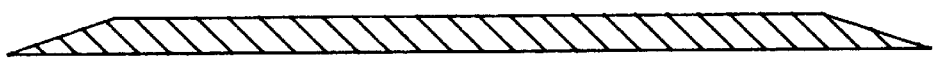
FIG. 8(*a*) is a diagrammatic end view showing the shape of the side edges of a P2 pole deposited by vacuum deposition.
Figure 8B:

Turning now to FIGS. 8(a) and 8(b), an additional benefit of the third magnetic layer 40 can be achieved for vacuum deposited laminated first and second magnetic layers 14 and 16 that photolithographically defined through liftoff. In FIG. 8(a), an air bearing view of a vacuum deposited P2 pole is shown after liftoff. As can be seen, the edges of the P2 pole, representing the edges of a recording track, taper. During writing, the extreme edges of the taper saturate prior to full magnetization and leave the track edges poorly defined. The conventional design approach is to correct that problem by completing the P2 trackwidth definition with ion milling. This process step is expensive and hard to control. By providing a third magnetic layer 40 deposited using electroplating, the designer can achieve a sufficiently thick magnetic P2 pole at the edges without ion milling. This is shown in FIG. 8(b).

Figure 9:
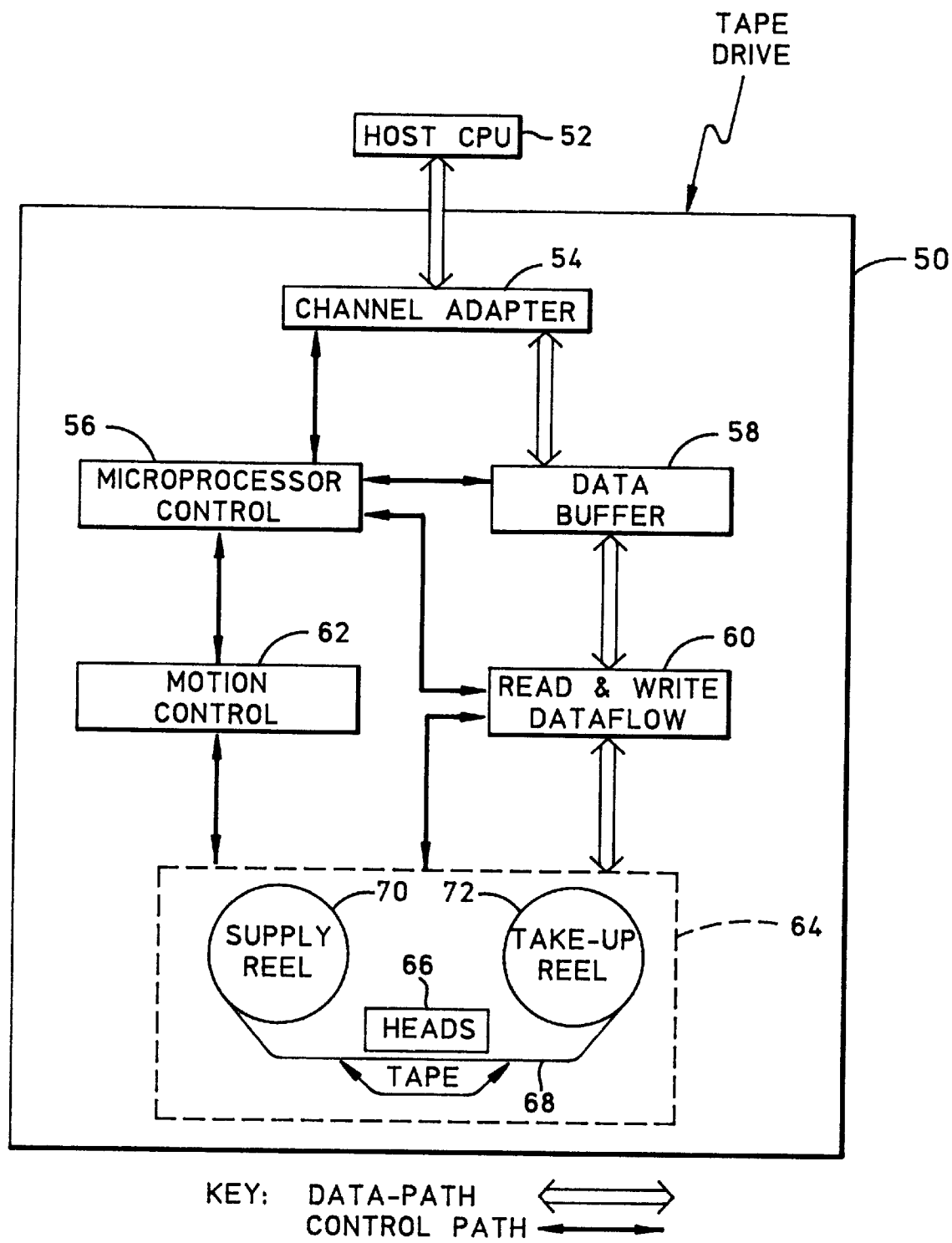
FIG. 9 is a plan view of a tape drive incorporating the thin film magnetic head of FIG. 1.

Turning now to FIG. 9, the thin-film magnetic head 10 of FIG. 1 may be advantageously incorporated in a magnetic tape storage drive 50, which is otherwise conventional in all respects. The tape drive 50 is adapted for storing and retrieving data provided by a host digital processing device 52, which could be a general purpose computer or other processing apparatus retrieving or writing data stored on a streaming magnetic tape medium. The tape drive 50 includes plural components providing a control system for reading and writing host data on the medium. Those components conventionally include a channel adaptor 54, a microprocessor controller 56, a data buffer 58, a read/write dataflow circuit 60, a motion control system 62 and a tape interface system 64. The microprocessor controller 56 provides overhead control functionality for the operations of all other components of the tape drive 50. The functions performed by the microprocessor controller 56 are programmable via microcode routines, as is known in the art. During data write operations (with all dataflow being reversed for data read operations), the microprocessor controller activates the channel adaptor 54 to perform the required host interface protocol for receiving an information data block. The channel adaptor 54 communicates the data block to the data buffer 58, which stores the data for subsequent read/write processing. The data buffer 58 in turn communicates the device data from the channel adaptor 54 to the read/write dataflow circuitry 60, which formats the device data into physically formatted data that may be recorded on a magnetic tape medium. The read/write dataflow circuitry 60 is also responsible for executing all read/write data transfer operations under the control of the microprocessor controller 56. Formatted physical data from the read/write dataflow circuitry 60 is communicated to the tape interface system 64, which includes one or more read/write heads 66 made in accordance with the invention, and appropriate drive components (not shown) for performing forward and reverse movement of a tape medium 68 mounted on a supply reel 70 and a take-up reel 72. The drive components are controlled by the motion control system 62 to execute such tape movements as forward and reverse recording and playback, rewind and other tape motion functions. In addition, in multi-track tape drive systems, the notion control system 62 transversely positions the read/write heads 66 relative to the direction of longitudinal tape movement in order to read and write data on a plurality of tracks.

Accordingly, a dual layer tape head design has been disclosed. While the invention has been particularly shown and described with reference to a preferred embodiment thereof, it will be understood by those skilled in the art that various other changes in form and detail may be made therein without departing from the spirit and scope of the invention, which is defined solely by the appended claims and their equivalents.

What is claimed is:

1. A tape drive thin-film magnetic head, comprising:
   a substrate;
   a first relatively wear resistant magnetic layer disposed above said substrate and formed by vacuum sputter deposition as a laminated sequence of magnetic sub-layers,
   a second relatively wear resistant magnetic layer disposed above said first magnetic layer and formed by vacuum sputter deposition as a laminated sequence of magnetic sub-layers;
   said first and second magnetic layers having corresponding first ends representing a pole tip region of said head, corresponding second ends representing a back gap region of said head, and corresponding intermediate portions representing an intermediate region of said head between said pole tip region and said back gap region;
   said first and second magnetic layers being joined together in physical contact at said back gap region and being spaced from one another at said pole tip region and at said intermediate region;
   a nonmagnetic gap layer disposed between said first and second magnetic layers at said pole tip region;
   said second magnetic layer having a sloped region wherein said second magnetic layer slopes away from said first magnetic layer behind said pole tip region to form a space for a magnetic coil structure, said sloped region having less magnetic permeability than other portions of said second magnetic layer as a result of the vacuum sputter deposition process used to form said second magnetic layer;
   a magnetic coil structure disposed between said first and second magnetic layers at said intermediate region; and
   a third magnetic layer disposed on said second magnetic layer, said third magnetic layer being formed by electroplating and extending from said back gap region to cover at least said sloped region of said second magnetic layer, and said third magnetic layer being less wear resistant but more magnetically permeable than said first and second magnetic layers and having the same magnetic permeability in said sloped region as in other regions thereof by controlling the electroplating process used to form said third magnetic layer.

2. The tape drive head of claim 1 wherein said third magnetic layer extends from said back gap region to said pole tip region of said head.

3. The tape drive head of claim 1 wherein said pole tip region of said head terminates at an air-bearing surface (ABS) and said third magnetic layer extends to said ABS.

4. The tape drive head of claim 1 wherein said first and second magnetic layers are formed from a NiFeN/FeN laminate and said third magnetic layer is formed from a NiFe composition.

5. The tape drive head of claim 1 wherein said second magnetic layer tapers to first and second side edges at said pole tip region of said head as a result of the vacuum sputter deposition process used to form said second magnetic layer and wherein said third magnetic layer overlies said first and second side edges in order to form side pole tip side walls at said pole tip region by controlling the electroplating process used to form said third magnetic layer.

6. A method for making a thin-film magnetic head, comprising the steps of:

providing a substrate;

forming a first relatively wear resistant magnetic layer by vacuum sputter deposition above said substrate as a laminated sequence of magnetic sub-layers, forming a nonmagnetic gap layer over a portion of said first magnetic layer;

forming a conductive coil structure over a portion of said gap layer;

forming a second relatively wear resistant magnetic layer by vacuum sputter deposition over said gap layer, said coil structure and said first magnetic layer as a laminated sequence of magnetic sub-layers;

said first and second magnetic layers being formed to have corresponding first ends representing a pole tip region of said head, corresponding second ends representing a back gap region of said head, and corresponding intermediate portions representing an intermediate region of said head between said pole tip region and said back gap region;

said first and second magnetic layers being joined together in physical contact at said back gap region and being spaced from one another at said pole tip region and at said intermediate region;

said second magnetic layer having a sloped region wherein said second magnetic layer slopes away from said first magnetic layer behind said pole tip region of said head to form a space for a magnetic coil structure, said sloped region having less magnetic permeability than other portions of said second magnetic layer as a result of the vacuum sputter deposition process used to form said second magnetic layer; and forming a third magnetic layer over said second magnetic layer, said third magnetic layer being formed by electroplating and extending from said back gap region to cover at least said sloped region of said second magnetic layer, and said third magnetic layer being less wear resistant but more magnetically permeable than said first and second magnetic layers and having the same magnetic permeability in said sloped region as in other regions thereof by controlling the electroplating process used to form said third magnetic layer.

7. The method of claim 6 wherein said third magnetic layer extends from said back gap region to said pole tip region of said head.

8. The method of claim 6 wherein said pole tip region of said head terminates at an air-bearing surface (ABS) and said third magnetic layer extends to said ABS.

9. The method of claim 6 wherein said first and second magnetic layers are formed from a NiFeN/FeN laminate and said third magnetic layer is formed from a NiFe composition.

10. The method of claim 6 wherein said second magnetic layer tapers to first and second side edges at said pole tip region of said head as a result of the vacuum sputter deposition process used to form said second magnetic layer and wherein said third magnetic layer overlies said first and second side edges in order to form side pole tip side walls at said pole tip region by controlling the electroplating process used to form said third magnetic layer.

11. In a tape drive, a thin-film magnetic head, comprising:

a substrate;

a P1 pole formed by vacuum sputter deposition on said substrate;

a P2 pole formed over said P1 pole and having a sloped region and non-sloped regions;

a gap formed between said P1 and P2 poles; and said P2 pole including a first component applied by vacuum sputter deposition and made from a first relatively wear resistant, magnetically permeable material adjacent to said gap and a second component applied by electroplating and extending coextensively with said first component over at least said sloped region, said second component being made from a second relatively non-wear resistant material having greater magnetic permeability than said first component and having approximately the same magnetic permeability over said sloped region and said non-sloped regions of said first component as a result of the electroplating process used to form said second component.

* * * * *